United States Patent [19]
Oguchi et al.

[11] Patent Number: 5,149,989
[45] Date of Patent: Sep. 22, 1992

[54] METHOD FOR RESETTING A PHOTO-ELECTRIC CONVERTER

[75] Inventors: Takahiro Oguchi, Atsugi; Hayao Ohzu, Fuchu, both of Japan

[73] Assignee: Canon Kabushiki Kaisha, Tokyo, Japan

[21] Appl. No.: 625,372

[22] Filed: Dec. 11, 1990

[30] Foreign Application Priority Data

Dec. 14, 1989 [JP] Japan .................................. 1-322737

[51] Int. Cl.$^5$ .............................................. H04N 9/00
[52] U.S. Cl. ................................... 307/311; 307/570; 250/201.1
[58] Field of Search ............... 307/272.3, 592, 594, 307/597, 603, 279, 296.5, 311, 570; 358/41; 250/201.2, 201.7, 201.8; 328/2

[56] References Cited

U.S. PATENT DOCUMENTS

| | | | |
|---|---|---|---|
| 4,329,577 | 5/1982 | Asano et al. | 250/201.8 X |
| 4,942,459 | 7/1990 | Hieda et al. | 358/41 |
| 5,023,704 | 6/1991 | Hieda et al. | 358/41 X |

*Primary Examiner*—David Hudspeth
*Attorney, Agent, or Firm*—Fitzpatrick, Cella, Harper & Scinto

[57] ABSTRACT

In a photo-electric converter having a first reset circuit for resetting a charge stored in a control electrode to a first potential and a second reset circuit for rendering a main electrode of an output circuit to assume a second potential after the resetting by the first reset circuit to reset the residual charge of the control electrode, a third reset circuit for making a third reset which is equivalent to the second reset prior to the first reset is provided.

8 Claims, 3 Drawing Sheets

METHOD FOR RESETTING A PHOTO-ELECTRIC CONVERTER

BACKGROUND OF THE INVENTION

1. Field of the Invention

The present invention relates to a method and apparatus for resetting a photo-electric converter, and more particularly to resetting method and apparatus of a photo-electric converter which effects a first reset function to reset a charge stored in a control electrode to a first potential, and a second reset function to cause a main electrode of an output circuit to assume a second potential after the first reset function to reset the residual charge.

2. Related Background Art

A sensor used in an image reader such as a facsimile machine uses bipolar transistors as shown in Japanese Laid-Open Patent Application No. 60-12764.

FIG. 2 shows an equivalent circuit of an element of the sensor.

As shown in FIG. 2, the sensor comprises an NPN bipolar transistor T having a base thereof connected to a P-channel MOS transistor $M_{RES}$, and an emitter thereof connected to an N-channel MOS transistor $M_{VRS}$. A charge is stored in the base by light irradiation and an electrical signal representing the stored charge is produced at the emitter.

When a light is applied to the sensor while the base floats at a predetermined potential, a charge is stored and the base potential rises. As the base potential rises, an electrical signal is read out from the emitter.

A method for resetting the sensor after reading is now explained.

In FIG. 3, (A) and (B) show timing charts for the resetting method of a prior art sensor, (C) and (D) show changes in base and emitter potential levels for low light exposure, and (E) and (F) show changes in the base and emitter potential levels for high light exposure.

When a pulse $\phi_{RES}$ is at a negative potential for a period $T_1$ under low light exposure as shown in FIG. 3, (A), (B), (C) and (D), the P-channel MOS transistor $M_{RES}$ conducts and the base of the NPN bipolar transistor T is reset to a potential $V_{BG}$. (This is called a perfect reset).

When the pulse $\phi_{VRS}$ is at a high level for a period $T_2$, the N channel MOS transistor $M_{VRS}$ conducts and the emitter of the NPN bipolar transistor T is clamped to a potential $V_{VR}$ ($V_{BG} > V_{VR}$).

When the emitter potential $V_{EL}$ is clamped to $V_{VR}$, the base-emitter is forward biased and the base potential $V_{BL}$ converges to a fixed potential $V_K$. (This is called a transient reset). When the pulse thereafter falls, the N-channel MOS transistor $M_{VRS}$ is turned off and the base shifts to a store status. (This is called a store operation). In FIG. 3(C), SL represents a signal component.

On the other hand, under high light exposure, both the base and the emitter are near saturation potentials as shown in FIG. 3, (A), (B), (E) and (F). If the pulse $\phi_{RES}$ is at the negative potential during the period $T_1$ so that the perfect reset is effected, the base potential $V_{BH}$ is set to a potential $V_{BG}$ and the base-collector and the base-emitter are reverse biased.

When the pulse $\phi_{VRS}$ next assumes the high level during the period $T_2$, the base potential $V_{BH}$ is pulled to the emitter potential through a capacitance $C_{BE}$ (base-emitter capacitance) at the moment of the change of the emitter potential $V_{EH}$ to $V_{VR}$ so that it changes to a potential $V_K'$ which is lower than $V_{BG}$. As a result, the base-emitter is not forward biased and the intended transient reset is not effected, and the base starts the store operation from the lower potential $V_K'$ than $V_K$. Since the store operation starts from the lower potential $V_K'$ under the high light exposure rather than $V_K$ as under the lower light exposure, the signal level of the signal drops by ($V_K - V_K'$). This means that a real signal component $S_{H2}$ is read as an apparent signal component $S_{H1}$. As a result, the linearity of the photo-electric conversion characteristic in the high irradiation range is deteriorated.

SUMMARY OF THE INVENTION

It is an object of the present invention to solve the problems encountered in the prior art.

In a resetting method for the photo-electric converter in accordance with an embodiment of the present invention, in the photo-electric converter having a first reset for resetting a charge stored in a control electrode to a first potential and a second reset for rendering a main electrode of an output circuit to assume a second potential after the first reset to reset the residual charge of the control electrode to a second potential, a third reset which is equivalent to the second reset is effected prior to the first reset.

The term "equivalent to the second reset" means that the function to reset the residual charge of the control means by causing the main electrode of the output circuit to assume the second potential is equivalent and it does not mean that the reset condition such as a duration of reset period is same.

Deterioration of the linearity of the photo-electric conversion characteristic at high irradiation may occur because the control electrode and the main electrode of the output circuit are near the saturation potentials.

In the present invention, the third reset which is equivalent to the second reset in which the potential of the main electrode of the output circuit is rendered to the second potential to reset the residual charge of the base and lower the base potential to the predetermined potential $V_K$, is effected prior to the first reset so that the base and emitter potentials are lowered and the linearity in the high irradiation area is improved.

Other objects and features of the present invention will be apparent from the following description and the accompanying drawings.

DETAILED DESCRIPTION OF THE PREFERRED EMBODIMENTS

An embodiment of the present invention is now explained in detail with reference to the drawings.

Figure 2:
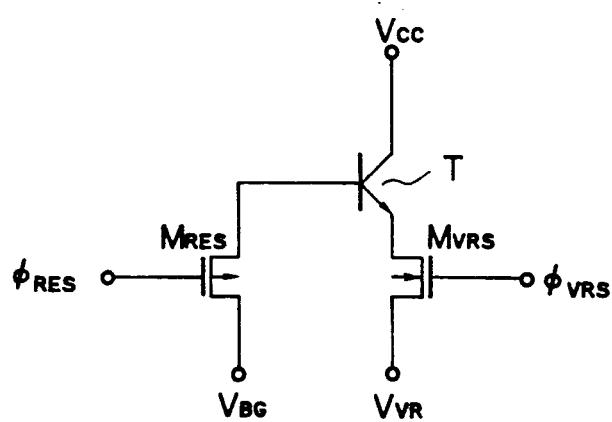
FIG. 2 shows an equivalent circuit of an element of a sensor.
Figure 3:
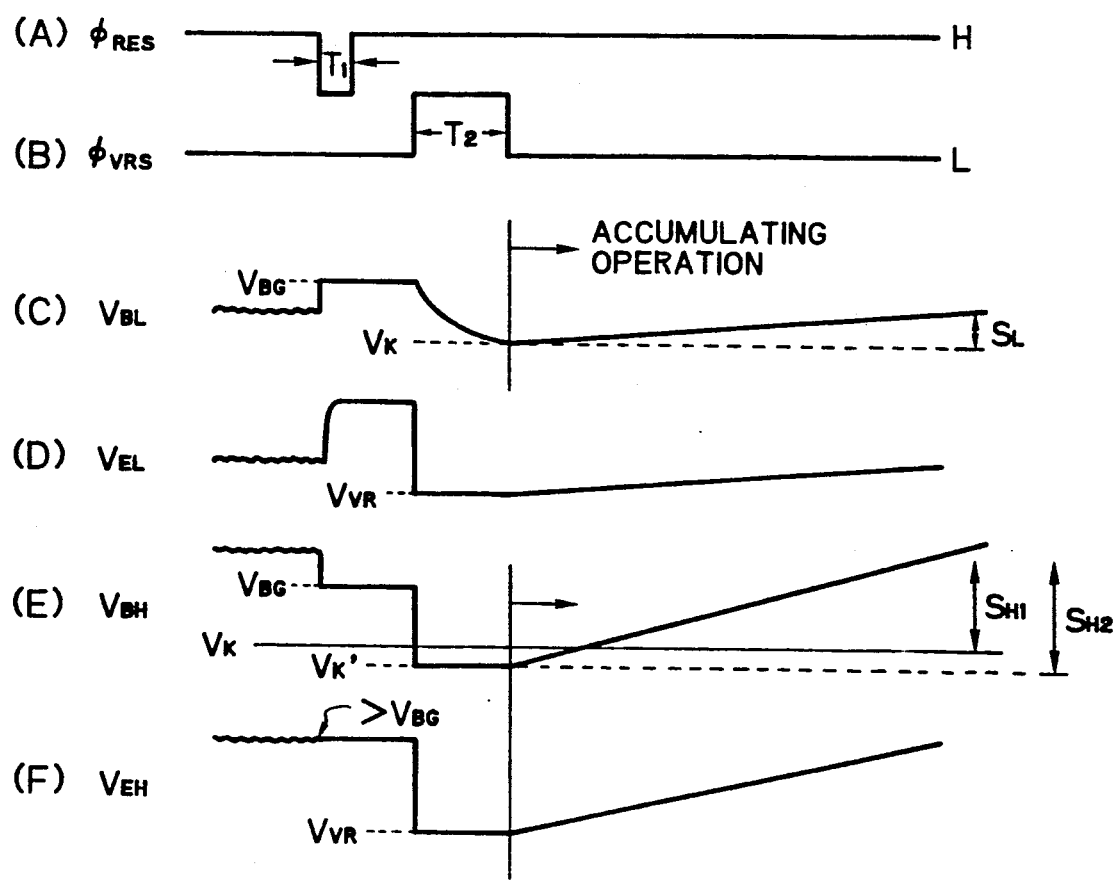
FIGS. 3(A)-3(F) show a timing chart and changes of potential levels, wherein (A) and (B) show timings charts for a prior art resetting method for a sensor, (C) and (D) show changes in base and emitter potential levels under a low light exposure, and (E) and (F) show changes in the base and emitter potential levels under a high light exposure.

A sensor shown in FIG. 2 is used and the explanation of the construction of the sensor is omitted.

Figure 1:
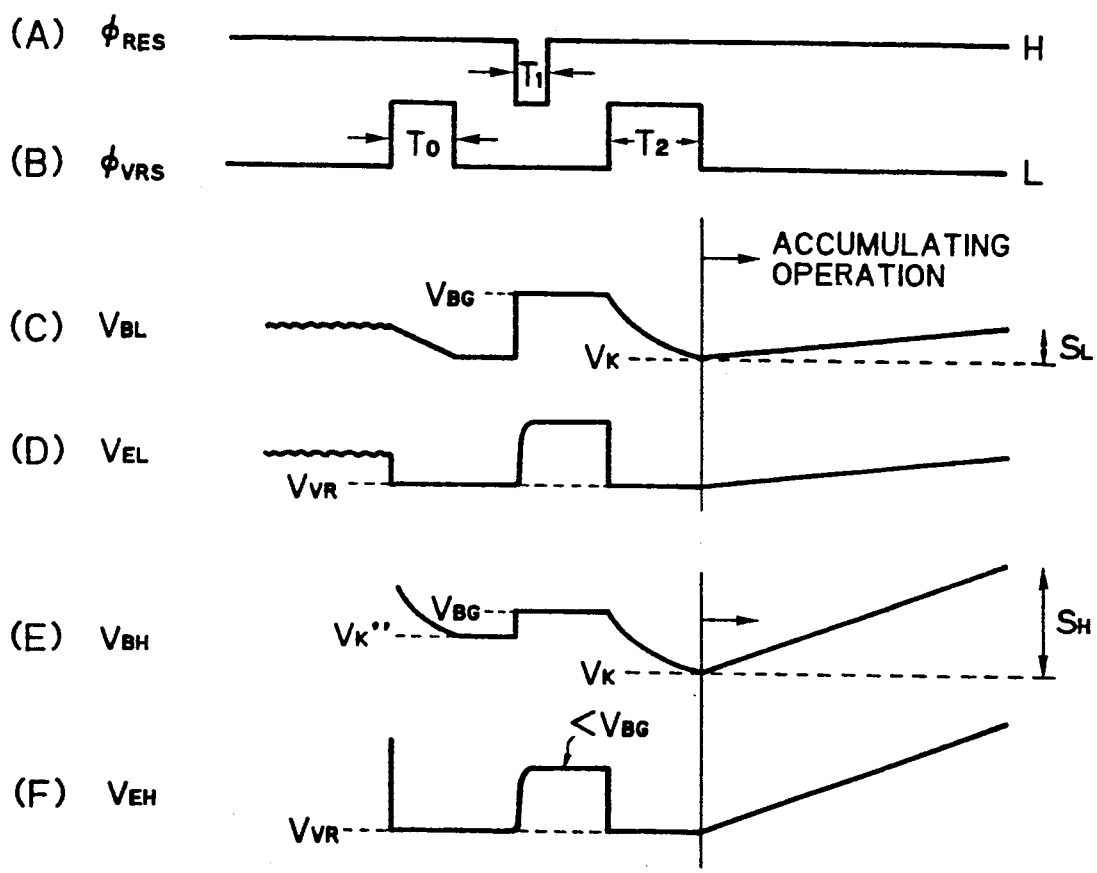
FIGS. 1(A)-1(F) show a timing chart for explaining a resetting method for a photo-electric converter of the present invention.

FIG. 1 shows a timing chart for explaining the resetting method of the photo-electric converter of the present invention.

Under the low light exposure, a pulse $\phi_{VRS}$ is applied at a first transient reset as the third reset. When the pulse assumes a high level in a period $T_0$, the emitter potential is set to $V_{VR}$ and the base potential is reset to a fixed potential (transient reset).

Thereafter, as described above, when the pulse $\phi_{RES}$ assumes a negative potential in a period $T_1$, the base of the NPN bipolar transistor T is reset to the potential $V_{BG}$ so that the perfect reset is effected as the first reset.

When the pulse $\phi_{VRS}$ next assumes the high level in a period $T_2$, the emitter of the NPN bipolar transistor T is clamped to the potential $V_{VR}$, the base-emitter is forwardly biased and the base potential $V_{BL}$ converges to the fixed potential $V_K$ so that the transient reset is effected as the second reset and an initial state for the store operation is established.

Under the high light exposure, the pulse $\phi_{VRS}$ is applied as the third reset at the first transient reset, and when the pulse assumes the high level in the period $T_0$, the emitter level which has been near saturation is set to $V_{VR}$ and the base potential which has also been near saturation is set to $V_K''$ ($V_K < V_K'' < V_{BG}$). The period $T_0$ of the first transient reset should be selected to meet $V_K'' < V_{BG}$.

In the subsequent reset operation, the base-emitter is forwardly biased like under the low light exposure and the reset is effected in the same manner as that of the prior art. Accordingly, the base potential of the sensor is reset to the fixed potential $V_K$. In accordance with the resetting method of the present invention, the base potential of each picture call is reset to the fixed potential $V_K$ regardless of the level of irradiation.

An embodiment of an image reader in accordance with the present invention is now explained.

Figure 4:
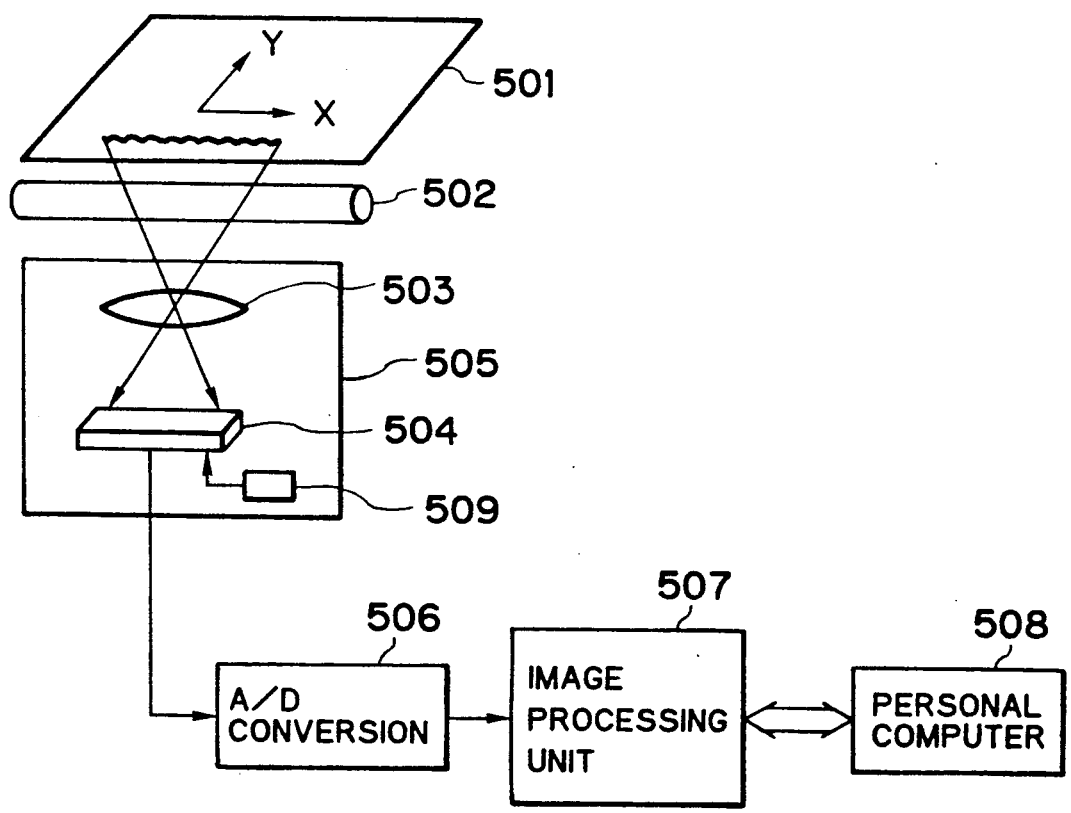
FIG. 4 shows a schematic configuration of an image reader.

FIG. 4 shows a schematic configuration of the image reader.

A document 501 is mechanically moved relative to a read unit 505 along an arrow Y. An image is read by scanning the document by an image sensor 504 which is driven by a pulse generator 509, along an arrow X.

A light from a light source 502 is reflected by the document 501, and a reflected light is focused on the image sensor 504 through a focusing optical system 503. The pulse generator 509 supplies a pulse as shown in FIG. 1 to the image sensor 504 so that carriers representing the intensity of the incident light are stored in the image sensor 504 and they are photo-electrically converted to produce an image signal.

The image signal is converted to a digital signal by an AD converter 506 and the digital signal is written into a memory in an image processor 507 as image data. Shading correction and color correction are made to the image data, and it is sent to a personal computer 508 or a printer.

After the image signal for the X direction scan has been completed, the document 501 is relatively moved along the Y direction, and the above operation is repeated. In this manner, the entire image of the document 501 is converted to the electrical signal and taken out as the image information.

In accordance with the resetting method for the photo-electric converter of the present invention, the charge stored in the control electrode can be reset regardless of the magnitude of irradiation and the linearity of the photo-electric conversion characteristic of the photo-electric converter is improved.

What is claimed is:

1. An image pickup device comprising:
   a) a transistor having a plurality of main electrodes and one control electrode;
   b) first switch means connected to said control electrode and driven by a first pulse, for resetting said control electrode to a first potential;
   c) second switch means connected to a first main electrode and driven by a second pulse, for resetting said first main electrode to a second potential; and
   d) control means for causing said second switch means to reset said first main electrode to the second potential, then causing said first switch means to reset said control electrode to the first potential, and then causing said second switch means to again reset said first main electrode to the second potential in order to reset said transistor.

2. An image pickup device according to claim 1 wherein said transistor is a bipolar transistor.

3. An image pickup device according to claim 1 wherein said first switch means is a MOS transistor.

4. An image pickup device according to claim 1 wherein said second switch means is a MOS transistor.

5. A resetting method for an image pickup device including a transistor having a plurality of main electrodes and one control electrode; first switch means connected to said control electrode for resetting said control electrode to a first potential; and second switch means connected to a first main electrode for resetting said first main electrode to a second potential; comprising the steps of:
   (a) resetting said first main electrode to the second potential by said second switch means which is driven by a second pulse;
   (b) resetting said control electrode to the first potential by said first switch means which is driven by a first pulse; and
   (c) resetting again said first main electrode to the second potential by said second switch means.

6. A resetting method according to claim 5 wherein said transistor is a bipolar transistor.

7. A resetting method according to claim 5 wherein said first switch means is a MOS transistor.

8. A resetting method according to claim 5 wherein said second switch means is a MOS transistor.

* * * * *

UNITED STATES PATENT AND TRADEMARK OFFICE
CERTIFICATE OF CORRECTION

PATENT NO. : 5,149,989
DATED : September 22, 1992
INVENTOR(S) : TAKAHIRO OGUCHI ET AL.

It is certified that error appears in the above-identified patent and that said Letters Patent is hereby corrected as shown below:

COLUMN 1

Line 45, "reset)." should read --reset.)--.
    Line 53, "reset)." should read --reset.)--.
    Line 56, "tion)." should read --tion.)--.

Signed and Sealed this

Twenty-sixth Day of October, 1993

Attest:

BRUCE LEHMAN

Attesting Officer    Commissioner of Patents and Trademarks